United States Patent
Walton et al.

(10) Patent No.: US 11,240,347 B2
(45) Date of Patent: Feb. 1, 2022

(54) DEVICE, SYSTEM AND METHOD FOR SHARING INFORMATION IN A CARD-BASED ENVIRONMENT

(71) Applicant: MOTOROLA SOLUTIONS, INC., Chicago, IL (US)

(72) Inventors: Brady Walton, Centerville, UT (US); Kylene Tanner, Bountiful, UT (US); Ernest Perkins, Layton, UT (US); Nicholas Paddock, Roy, UT (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/717,472

(22) Filed: Dec. 17, 2019

(65) Prior Publication Data
US 2021/0185149 A1 Jun. 17, 2021

(51) Int. Cl.
*H04L 29/06* (2006.01)
*H04L 29/08* (2006.01)

(52) U.S. Cl.
CPC .............. *H04L 67/38* (2013.01); *H04L 67/12* (2013.01); *H04L 67/20* (2013.01); *H04L 67/327* (2013.01)

(58) Field of Classification Search
CPC ....... H04L 67/12; H04L 67/20; H04L 67/327; H04L 67/38
USPC ......................................................... 709/206
See application file for complete search history.

(56) References Cited

U.S. PATENT DOCUMENTS

| 8,005,937 | B2 | 8/2011 | Wesey et al. |
| 2010/0262668 | A1* | 10/2010 | Piett ........................ H04W 4/90 |
| | | | 709/206 |
| 2017/0124853 | A1* | 5/2017 | Mehta .................. G08B 25/009 |
| 2018/0053401 | A1* | 2/2018 | Martin .................... H04W 4/90 |
| 2019/0174208 | A1* | 6/2019 | Speicher .................. H04Q 9/00 |
| 2019/0262668 | A1* | 8/2019 | Morales ............... B23K 20/021 |
| 2019/0287199 | A1 | 9/2019 | Messerges et al. |
| 2020/0314240 | A1* | 10/2020 | Leavitt ................... G16H 80/00 |

* cited by examiner

*Primary Examiner* — Frantz B Jean
(74) *Attorney, Agent, or Firm* — Perry + Currier, Inc.

(57) ABSTRACT

A device, system and method for sharing information in a card-based environment is provided. A display screen is controlled, via a first computing device of a first agency, to provide an incident card associated with a given incident managed by the first agency. A command is received to share information of the incident card with a second agency different from the first agency. A subset of the information is transmitted to a second computing device of the second agency. A display attribute, at the display screen, associated with the incident card, is controlled to indicate that the information thereof is at least partially shared with the second agency; and/or a shared incident card is generated in association with the incident card, the shared incident card visually distinguishable as including shared information relative to the incident card, and the shared incident card including at least the subset of the information.

19 Claims, 6 Drawing Sheets

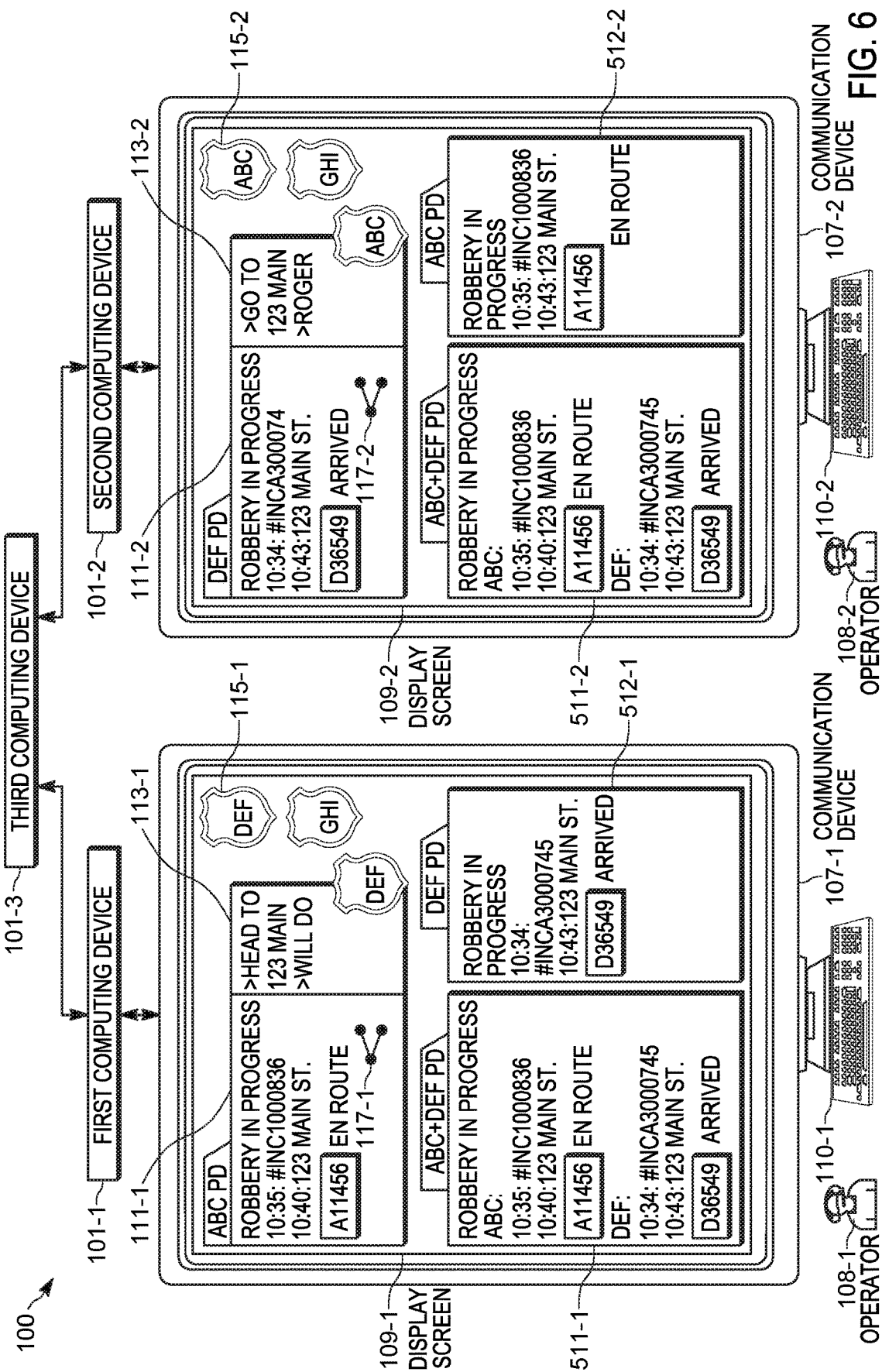

DEVICE, SYSTEM AND METHOD FOR SHARING INFORMATION IN A CARD-BASED ENVIRONMENT

BACKGROUND OF THE INVENTION

Public-safety agencies generally work with other public-safety agencies in responding to incidents. Coordinating responses to the incidents between the public-safety-agencies can be challenging.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 6 depicts an example of the system of FIG. 1 continuing to implement a process of sharing information in a public-safety answering point card-based environment, with incident cards, shared incident cards and read-only incident shown adjacent to one another, in accordance with some examples.

Figure 1:
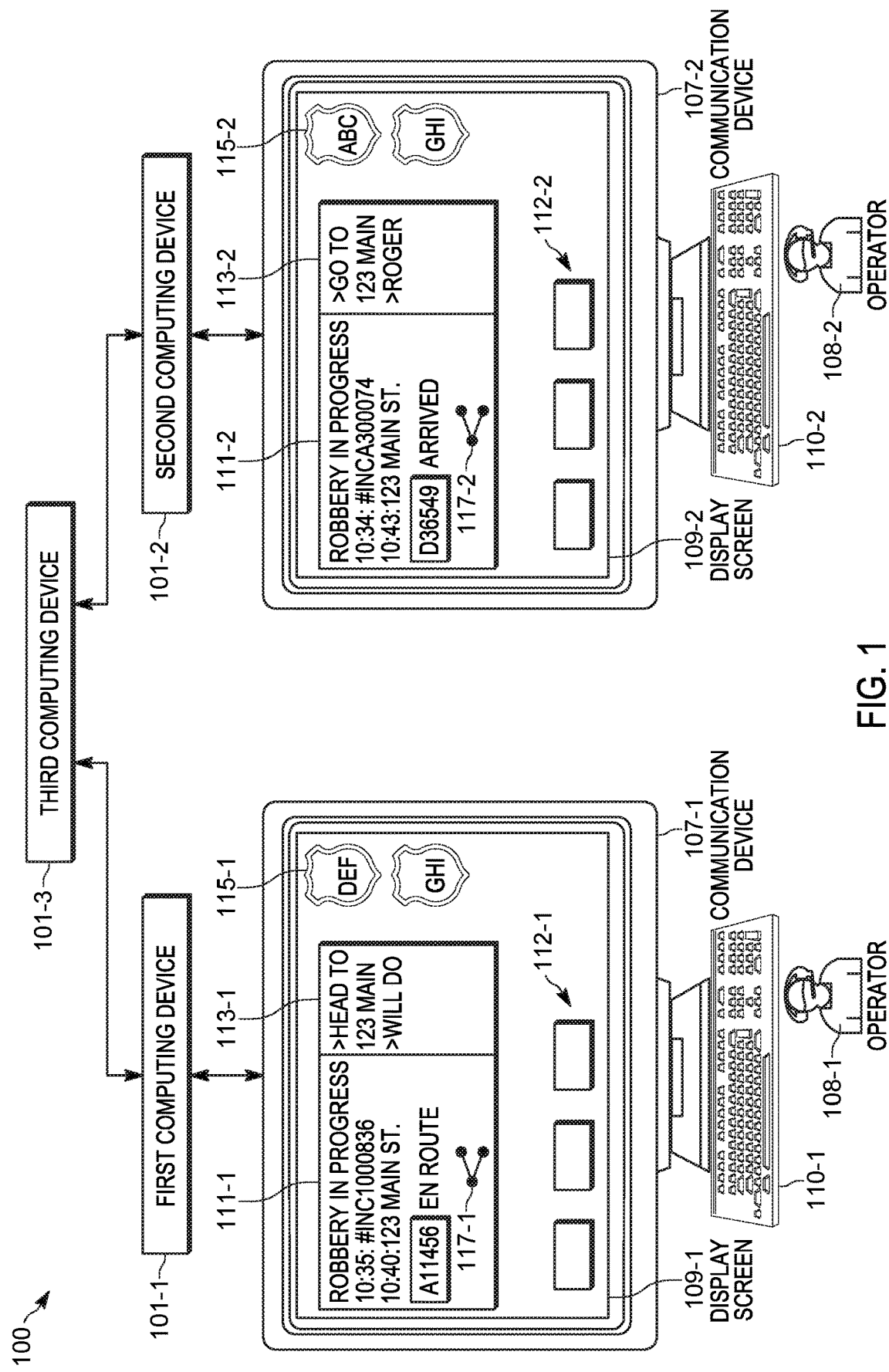
FIG. 1 is a system for sharing information in a card-based environment, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Public-safety agencies generally work with other public-safety agencies in responding to incidents. Coordinating responses to the incidents between the public-safety-agencies can be challenging. For example, a same and/or associated incidents may be independently reported to public-safety answering points (PSAPs) of each agency. The public-safety agencies may be local to each other and each may manage incidents in a card-based environment, for example with incidents and/or calls represented at display screens of terminals of PSAPs as cards. To assist in managing the incidents and/or coordinating responses to the incidents across the public-safety agencies, the cards may be utilized to share information therebetween, for example using commands to share information from the cards between PSAP computing devices.

An aspect of the present specification provides a method comprising: controlling, via a first computing device associated with a first agency, a display screen to provide an incident card associated with a given incident managed by the first agency; receiving, via the first computing device, a command to share information of the incident card with a second agency different from the first agency; transmitting, via the first computing device, at least a subset of the information to a second computing device associated with the second agency; and, one or more of: controlling, via the first computing device, at the display screen, a display attribute, associated with the incident card, to indicate that the information thereof is at least partially shared with the second agency; and generating, via the first computing device, at the display screen, a shared incident card in association with the incident card, the shared incident card visually distinguishable as including shared information relative to the incident card, and the shared incident card including at least the subset of the information.

Another aspect of the present specification provides a device comprising: a communication unit; and a controller configured to: control, via the communication unit, a display screen, of a first computing device associated with a first agency, to provide an incident card associated with a given incident managed by the first agency; receive, via the communication unit, a command to share information of the incident card with a second agency different from the first agency; transmit, via the communication unit, at least a subset of the information to a second computing device associated with the second agency; and, one or more of: control, via the communication unit, at the display screen, a display attribute, associated with the incident card, to indicate that the information thereof is at least partially shared with the second agency; and generate, at the display screen, a shared incident card in association with the incident card, the shared incident card visually distinguishable as including shared information relative to the incident card, and the shared incident card including at least the subset of the information. The device may comprise one or more of the first computing device, the second computing device, and a third computing device in communication with the first computing device and the second computing device.

Attention is directed to FIG. 1, which depicts an example system 100 for sharing information in a card-based environment. The system 100 comprises a first computing device 101-1, a second computing device 101-2, and a third computing device 101-3 in communication with each other via communication links. Communication links between components of the system 100 are depicted in FIG. 1, and throughout the present specification, as double-ended arrows between respective components; the communication links may include any suitable combination of wireless and/or wired links and/or wireless and/or wired communication networks. Hence, for example, as depicted, the third computing device 101-3 may be in communication with the computing devices 101-1, 101-2 via respective communication links and/or the computing devices 101-1, 101-2 may be in communication with each other via respective communication links with the third computing device 101-3.

However, in other examples, the third computing device 101-3 may be optional, with functionality thereof provided at one or more of the computing devices 101-1, 101-2; in these examples, the computing devices 101-1, 101-2 may be in communication via one or more communication links or networks therebetween. The computing devices 101-1, 101-2, 101-3 are interchangeably referred to hereafter, collectively, as the computing devices 101 and, generically, as a computing device 101.

In particular, the computing devices 101-1, 101-2 may comprise public-safety answering point (PSAP) computing devices for dispatch centers and/or 911 call centers, for example for different agencies (e.g. police departments, fire departments, 911 call agencies). Such agencies may be local to each other, for example public-safety agencies of different jurisdictions (e.g. counties), and the like, of a state, and the like. The third computing device 101-3, if present, may generally mediate communications and/or information sharing between the computing devices 101-1, 101-2, for example to assist with coordinating responses to incidents between the different agencies.

Hereafter, it is understood that the first computing device 101-1 is associated with a first agency (e.g. a first police department and/or a first public-safety agency) and that the second computing device 101-s is associated with a second agency (e.g. a second police department and/or a second public-safety agency). It is further understood that the agencies have agreed to share and/or coordinate information therebetween, for example via the third computing device 101-3.

As depicted, the system 100 further comprises communication devices 107-1, 107-2 in communication with respective computing device 101-1, 101-2 via respective communication links. The communication devices 107-1, 107-2 are interchangeably referred to hereafter, collectively, as the communication devices 107 and, generically, as a communication device 107.

As depicted, the communication devices 107 may comprise dispatch terminals to which a respective computing device 101 may forward calls, messages and the like, for reporting incidents and/or public-safety incidents (e.g. such calls, messages and the like may be from the general public, public-safety personnel, first responders and/or any suitable source). The communication devices 107 are generally operated by human users, for example, as depicted, operators 108-1, 108-2, such as 911 call center operators, dispatchers, and the like. The operators 108-1, 108-2 are interchangeably referred to hereafter, collectively, as the operators 108 and, generically, as an operator 108. In some embodiments, the devices 101, 107 may be instantiated in a same single device, and functionality described herein as attributed to device 101 and/or 107 provided by a same single device, or via some other configuration of devices at a PSAP.

The communication devices 107 generally includes respective display screens 109-1, 109-2 and respective input devices 110-1, 110-2. The display screens 109-1, 109-2 are interchangeably referred to hereafter, collectively, as the display screens 109 and, generically, as a display screen 109; similarly, the input devices 110-1, 110-2 are interchangeably referred to hereafter, collectively, as the input devices 110 and, generically, as an input device 110. The input devices 110 may include, but are not limited to, keyboards (e.g. as depicted), pointing devices, microphones, and the like, and/or any other suitable input device configured to receive input, for example by the operators 108 operating one or more input devices 110 and/or interacting with one or more input devices 110.

While two computing devices 101-1, 101-2 for different agencies are depicted, the system 100 may comprise any suitable number of computing device 101-1, 101-2 for any suitable number of agencies, which may be in communication with each other via the third computing device 101-3.

Similarly, while two communication devices 107 are depicted, the system 100 may comprise any suitable number of communication devices 107 (e.g. dispatch terminals) and associated operators 108 and/or human users. For example, each of the computing devices 101-1, 101-2 may be in communication with a plurality of respective communication devices 107. Each communication device 107 may comprise one of tens and/or hundreds and/or thousands (and/or any suitable number) of terminals of a respective PSAP for a respective agency; similarly, each operator 108 may comprise one of tens and/or hundreds and/or thousands (and/or any suitable number) of human users of the terminals for the respective PSAPs.

However, while present examples will be described with respect to PSAPs, the system 100 may be configured to manage incidents for any suitable type of call center, dispatch center, including but not limited to private or enterprise security centers and the like.

As depicted, information for incidents is being managed by the computing devices 101 in a card-based environment. For example, as depicted, the display screens 109 have each been controlled (e.g. via respective computing devices 101-1, 101-2) to provide and/or render incident cards representing respective incidents. In particular, as depicted, the display screens 109 have been controlled by respective computing devices 101-1, 101-2 to provide and/or render respective incident cards 111-1, 111-2 for an incident (e.g. a public-safety incident). Hereafter, the terms "provide" and "render" are used interchangeably. In present examples, incident cards 111-1, 111-2 are described with respect to a respective incident being a same incident and/or an associated incident (e.g. a "Robbery-In-Progress" at "23 Main St.") but reported by different calls and/or messages to the different agencies associated with the computing devices 101-1, 101-2. However, in other examples, the incident may have been reported to only one of the different agencies, and hence only one of the respective incident cards 111-1, 111-2 may be provided at respective display screens 109.

As depicted, the display screens 109 have been further controlled to provide further respective incident cards 112-1, 112-2, representing different incidents being managed by the respective agencies. While for simplicity the incident cards 112-1, 112-2 are depicted without information shown therein, the incident cards 112-1, 112-2 are understood to show and/or provide information for respective incidents, similar to the incident cards 111-1, 111-2; similarly, while for simplicity the incident cards 112-1, 112-2 are depicted as being smaller than the incident cards 111-1, 111-2, the incident cards 112-1, 112-2 may be a same and/or similar size as the incident cards 111-1, 111-2.

The incident cards 111-1, 111-2 are interchangeably referred to hereafter, collectively, as the incident cards 111 and, generically, as an incident card 111; similarly, the incident cards 112-1, 112-2 are interchangeably referred to hereafter, collectively, as the incident cards 112 and, generically, as an incident card 112.

In general, an incident card 111, 112 may be automatically generated via a respective computing device 101-1, 101-2 and/or via a respective operator 108 operating a respective input device 110 (e.g. when answering and/or responding to a call and/or a message).

As depicted, the incident cards 111 includes respective fields for a type of an associated given incident (e.g. "Robbery-In-Progress") and respective fields for an address thereof (e.g. "123 Main St."). As depicted, the incident cards further include other information and/or other fields such as respective fields for a timeline of respective events, and a respective identifier of a first responder and/or public-safety personnel respectively dispatched to the associated given incident.

For example, the incident card 111-1 includes fields for a timeline that shows times and events occurring in relation to a respective incident, as populated automatically by the first computing device 101-1 and/or by the operator 108-1 interacting with the input device 110-1; as depicted, the timeline shows that an incident number "INC1000836" was assigned to the respective incident at a time "10:35", and that a patrol unit, and the like, of the first agency, was dispatched to the address of the incident "123 Main St." at "10:40". Similarly, the incident card 111-1 includes a field for an identifier "A11456" of the patrol unit, and the like (e.g. an first agency officer and/or asset dispatched to the incident), dispatched to the address of the incident, a field for a status "En-Route" of the respective patrol unit, and the like, of the first agency; in some examples, the incident card 111-1 may include a field for a location of the patrol unit, and the like. Similarly, the incident card 111-1 includes a chat window 113-1 showing chat and/or message data exchanged between the operator 108-1 and the respective patrol unit.

As depicted, the incident card 111-2 includes fields similar to the incident card 111-1, though the fields of the incident card 111-2 may be the same or different from the incident card 11-1. As depicted, the incident card 111-2 includes fields for a timeline that shows times and events occurring in relation to a respective incident, as populated automatically by the second computing device 101-2 and/or by the operator 108-2 interacting with the input device 110-2; as depicted, the timeline shows that an incident number "INCA3000745" was assigned to the respective incident at a time "10:34", and that a patrol unit, and the like, of the second agency (e.g. a second agency officer and/or asset dispatched to the respective incident), was dispatched to the address of the incident "123 Main St." at "10:43". Similarly, the incident card 111-2 includes a field for an identifier "D36549" of the respective patrol unit, and the like, dispatched to the address of the incident, a field for a status "Arrived" of the respective patrol unit, and the like, of the second agency; in some examples, the incident card 111-2 may include a field for a location of the respective patrol unit, and the like. Similarly, the incident card 111-2 includes a chat window 113-2 showing chat and/or message data exchanged between the operator 108-2 and the respective patrol unit.

However, the incident cards 111-1, 111-2 may comprise any suitable number fields and/or any suitable information additional to and/or as a subset of that depicted in FIG. 1.

Hence it is understood that the communication devices 107 and/or the computing devices 101 are generally configured to communicate with the respective communication devices of the patrol units, and the like. Furthermore, while communications are described herein with respect to patrol units (e.g. police officers, police vehicles, and the like), it is understood that communication may be with any suitable public-safety personnel and/or any suitable users including, but not limited to, fire fighters, emergency medical technicians, private or enterprise security personnel, and the like.

As will be explained hereafter, the third computing device 101-3 may communicate with the computing devices 101-1, 101-2 to detect common incidents therebetween, for example based on incident types and/or addresses of incidents, and/or the third computing device 101-3 may communicate with the computing devices 101-1, 101-2 to share information therebetween using one or more of the incident cards 111 as a starting point, and the like.

In some examples, such sharing may include using graphic indicators 115-1, 115-2 of the various agencies provided at the respective display screens 109. For example, as depicted, the display screen 109-1 has been controlled to provide the graphic indicator 115-1 indicative of the second agency associated with the second computing device 101-2, and the display screen 109-2 has been controlled to provide the graphic indicator 115-2 indicative of the first agency associated with the first computing device 101-1. The graphic indicators 115-1, 115-2 are interchangeably referred to hereafter, collectively, as the graphic indicators 115 and, generically, as a graphic indicator 115.

As depicted, the graphic indicators 115 are provided as icons and/or badges of the respective agencies (e.g. the graphic indicator 115-1 comprises a badge labelled with a name "DEF" of the second agency, such as a police department of a county "DEF; and the graphic indicator 115-2 comprises a badge labelled with a name "ABC" of the first agency, such as a police department of a county "ABC") however the graphic indicators 115 may be of any suitable format indicating the respective agencies.

Furthermore, while respective examples are described with respect to two agencies sharing information in a card-based environment, in other examples, information may be shared with more than two agencies. Hence, as depicted, each display screen 109 may include a respective graphic indicator of at least a third agency (e.g. as depicted a badge labelled with a name "GHI" of the third agency). Indeed, information may be shared between any suitable number of agencies, with a suitable number of graphical indicators 115 being provided at the display screens 109, the graphical indicators 115 indicative of a respective agency with which information may be shared, as described hereafter.

In some examples, sharing information between the computing devices 101-1, 101-2 may occur using actuatable options 117-1, 117-2 associated with the incident cards 111-1, 111-2. For example, as depicted, the incident cards 111 include respective actuatable options 117-1, 117-2 which may be actuated by a respective operator 108, for example, via a respective input device 110, to share information associated with a respective incident card, as described in more detail below; in particular, actuation of an actuatable option 117-1, 117-2 may occur in conjunction with receiving input identifying an agency and/or a computing device 101-1, 101-2 which whom information is to be shared, for example via a drop-down list and/or some other suitable user interface (UI) mechanism. The actuatable options 117-1, 117-2 are interchangeably referred to hereafter, collectively, as the actuatable options 117 and, generically, as an actuatable option 117.

Figure 2:
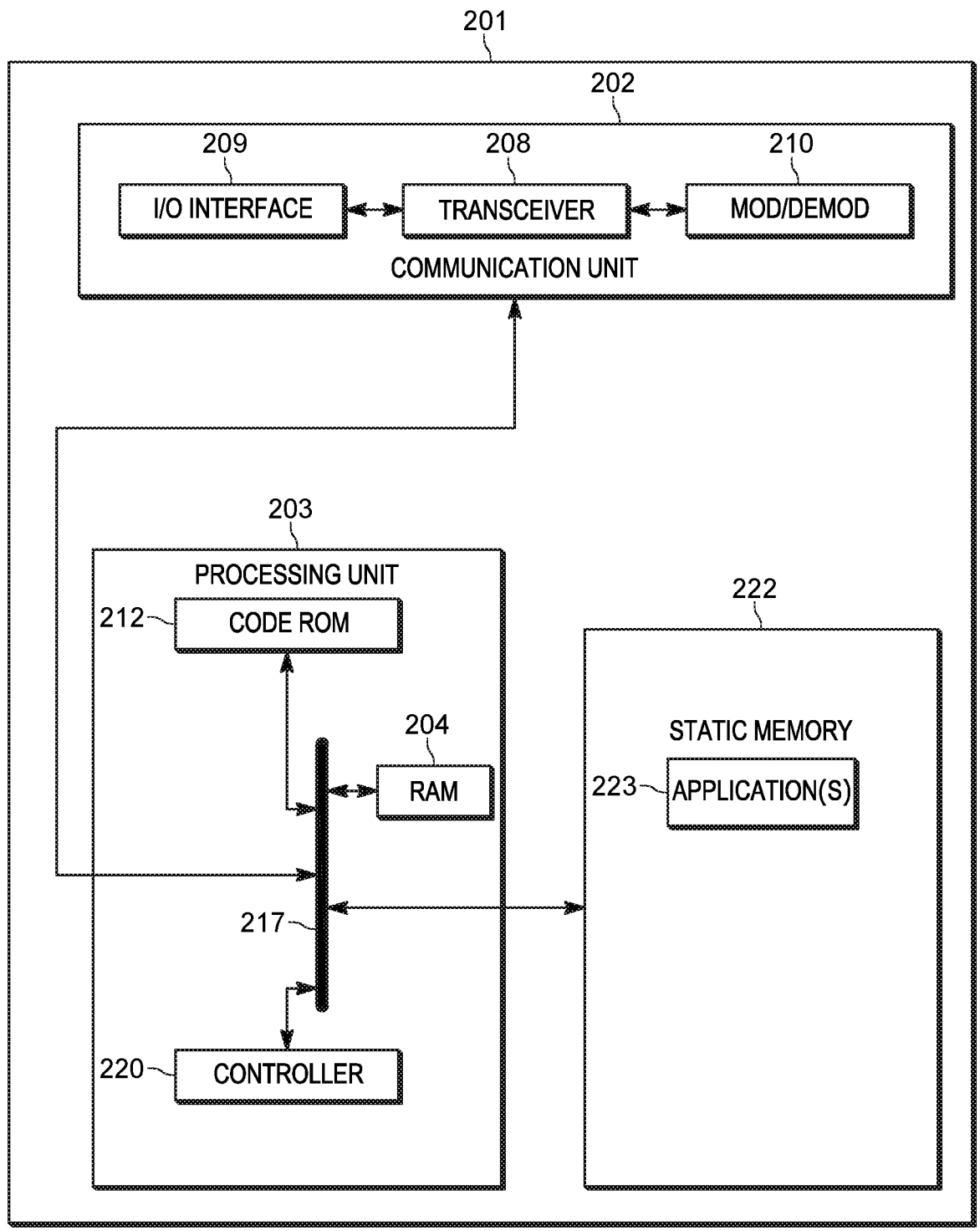
FIG. 2 is a device diagram showing a device structure of a computing device for sharing information in a card-based environment, in accordance with some examples.

Attention is next directed to FIG. 2 which depicts a schematic block diagram of an example of a computing device 201. The computing device 201 may comprise one or more servers and/or one or more cloud computing devices, and the like. Specifically, the computing device 201 is configured for sharing information in a card-based environment of the system 100; for example, the computing device 201 may comprise one or more of the computing devices 101 and/or the functionality of the computing device 201 may be distributed between one or more of the computing devices 101.

As depicted, the computing device 201 comprises: a communication unit 202, a processing unit 203, a Random-Access Memory (RAM) 204, one or more wireless transceivers 208, one or more wired and/or wireless input/output (I/O) interfaces 209, a combined modulator/demodulator 210, a code Read Only Memory (ROM) 212, a common data and address bus 217, a controller 220, and a static memory 222 storing at least one application 223. Hereafter, the at least one application 223 will be interchangeably referred to as the application 223.

While not depicted, the computing device 201 may include one or more of an input device and a display screen and the like, such that a user, such as an operator 108, and/or an administrator of the system 100 may interact with the computing device 201. However, a user may interact with the computing device 201 via a communication device 107, for example via a display screen 109 and/or an input device 110.

As shown in FIG. 2, the computing device 201 includes the communication unit 202 communicatively coupled to the common data and address bus 217 of the processing unit 203.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communication unit 202 may include one or more wired and/or wireless input/output (I/O) interfaces 209 that are configurable to communicate with components of the system 100. For example, the communication unit 202 may include one or more transceivers 208 and/or wireless transceivers for communicating with the computing devices 101 (e.g. when the computing device 201 comprises the third computing device 101-3, the communication unit 202 is generally configured to communicate with the other computing devices 101-1, 101-2, etc.). Hence, the one or more transceivers 208 may be adapted for communication with one or more communication networks used to facilitate communication between the components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) networks, a 5G network (e.g. a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a Bluetooth transceiver, a Wi-Fi transceiver, a WiMAX transceiver, and/or another similar type of wireless transceiver configurable to communicate via a wireless radio network.

The communication unit 202 may optionally include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g. hardware ports) for coupling to other hardware components.

The controller 220 includes one or more logic circuits, one or more processors, one or more microprocessors, one or more ASIC (application-specific integrated circuits) and one or more FPGA (field-programmable gate arrays), and/or another electronic device. In some examples, the controller 220 and/or the computing device 201 is not a generic controller and/or a generic device, but a device specifically configured to implement functionality for sharing information in a card-based environment. For example, in some examples, the computing device 201 and/or the controller 220 specifically comprises a computer executable engine configured to implement functionality for sharing information in a card-based environment.

The static memory 222 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the computing device 201 as described herein are maintained, persistently, at the memory 222 and used by the controller 220 which makes appropriate utilization of volatile storage during the execution of such programming instructions.

Figure 3:
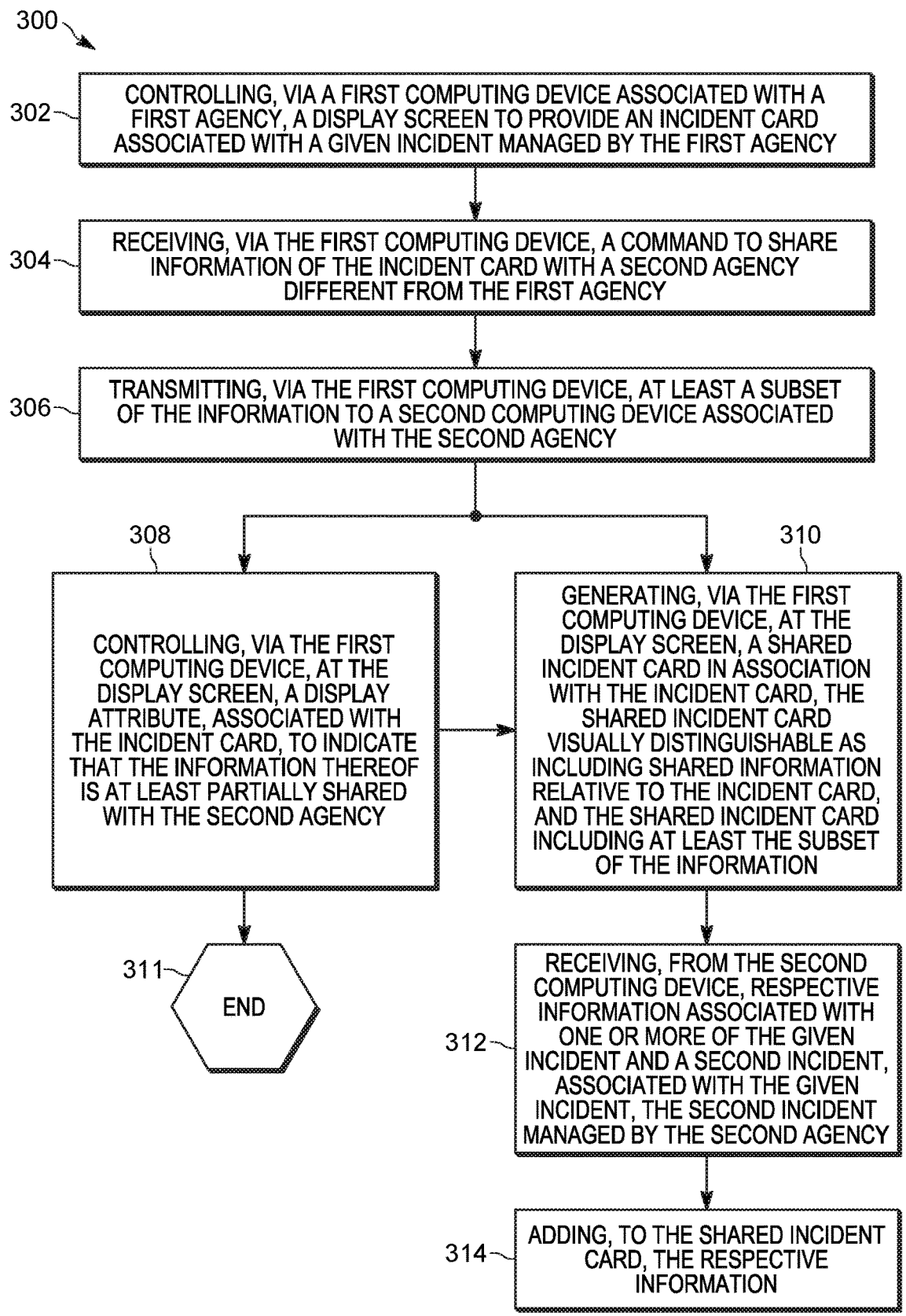
FIG. 3 is a flowchart of a process for sharing information in a card-based environment, in accordance with some examples.

In particular, the memory 222 stores instructions corresponding to the at least one application 223 that, when executed by the controller 220, enables the controller 220 to implement functionality for card-based incident information sharing including, but not limited to, the blocks of the method and/or process set forth in FIG. 3.

In illustrated examples, when the controller 220 executes the one or more applications 223, the controller 220 is enabled to: control, via a first computing device (e.g. the first computing device 101-1) associated with a first agency, a display screen to provide an incident card associated with a given incident managed by the first agency; receiving, via the first computing device, a command to share information of the incident card with a second agency different from the first agency; transmitting, via the first computing device, at least a subset of the information to a second computing device (e.g. the second computing device 101-2) associated with the second agency; and, one or more of: controlling, via the first computing device, at the display screen, a display attribute, associated with the incident card, to indicate that the information thereof is at least partially shared with the second agency; and generating, via the first computing device, at the display screen, a shared incident card in association with the incident card, the shared incident card visually distinguishable as including shared information relative to the incident card, and the shared incident card including at least the subset of the information.

Attention is now directed to FIG. 3 which depicts a flowchart representative of a method and/or process 300 for sharing information in a card-based environment. The operations of the process 300 of FIG. 3 correspond to machine readable instructions that are executed by the computing device 201 and/or one or more of the computing devices 101. In the illustrated example, the process may be implemented by the controller 220, and the instructions represented by the blocks of FIG. 3 are stored at the memory 222 for example, as the application 223. The process 300 of FIG. 3 is one way in which the controller 220 and/or the computing device 201 and/or the computing devices 101, and/or the system 100 may be configured. Furthermore, the following discussion of the process 300 of FIG. 3 will lead to a further understanding of the system 100, and its various components.

The process 300 of FIG. 3 need not be performed in the exact sequence as shown and likewise various blocks may be performed in parallel rather than in sequence. Accordingly, the elements of process 300 are referred to herein as "blocks" rather than "steps." The process 300 of FIG. 3 may be implemented on variations of the system 100 of FIG. 1, as well.

Furthermore, while the process 300 is described with information shared from the first computing device 101-1 to the second computing device 101-2 as a starting point, it is understood that information may be shared from the second computing device 101-2 to the first computing device 101-1 as a starting point.

At a block 302, the controller 220 and/or the computing device 201 and/or one or more of the computing devices 101 controls, via the first computing device 101-1 associated with a first agency, the display screen 109-1 to provide the incident card 111-1 associated with a given incident managed by the first agency.

For example, as described above, the first computing device 101-1 may control the display screen 109-1 to provide the incident card 111-1 automatically, for example when a call and/or message reporting the associated given incident is received at the first computing device 101-1; and/or the first computing device 101-1 may control the display screen 109-1 to provide the incident card 111-1 in response to the operator 108-1 operating the input device 110-1 to generate the incident card 111-1, for example as the operator 108-1 speaks with a caller reporting the associated given incident.

For example, an incident card 111 generally represents an incident (e.g. the incident being reported by the caller with whom the operator 108-1 is speaking) and comprises any suitable fields for receiving information associated with the incident. As described above, such fields may include, but are not limited to: a field for a given incident type, a field for an incident address, fields for a timeline of respective events associated with the incident, fields for identifiers of first responders and/or public-safety personnel dispatched to an incident, a chat window, and the like. Indeed, the incident cards 111 generally graphically represent incidents being managed by the system 100 and/or the operators 108 and/or the devices 101, 107.

At a block 304, the controller 220 and/or the computing device 201 and/or one or more of the computing devices 101 receives, via the first computing device 101-1, a command to share information of the incident card 111-1 with a second agency different from the first agency.

In some examples, receiving the command to share the information of the incident card 111-1 with the second agency may comprise: detecting a drag and drop, at the display screen 109-1, of the incident card 111-1 to the graphic indication 115-1 of the second agency. In these examples, the operator 108-1 may use a pointing device of the input device 110 (e.g. a mouse and the like), to select the incident card 111-1 at an initial position, and drag the incident card 111-1 to the graphic indication 115-1. The incident card 111-1 may then return to the initial position and/or move to a different position. Regardless, the drag and drop action is indicative of a command to share the information of the incident card 111-1 with the specified second agency as represented by the graphic indication 115-1. As such, it is understood that the graphic indications 115 may be mapped to identifiers of respective computing devices 101-1, 101-2.

In other examples, receiving the command to share the information of the incident card 111-1 with the second agency may comprise: detecting activation of the actuatable option 117-1 associated with incident card 111-1; and receiving input identifying the second agency. For example, the operator 108-1 may use a pointing device of the input device 110 (e.g. a mouse and the like), to select the actuatable option 117-1 and further use the pointing device to select the graphic indicator 115-1, which may alternatively appear in a drop-down list responsive to activation of the actuatable option 117-1. Hence, selection of the actuatable option 117-1 and further selection of the graphic indicator 115-1 may comprise the command to share the information of the incident card 111-1 with the second agency. In some examples, with brief reference back to FIG. 1, the incident card 111-2 may not yet be present (e.g. there may be no incident, managed by the computing device 101-2, associated with the given incident of the incident card 111-1) and the actuatable option 117-1 may be actuated to share information of the incident card 111-1 with the second computing device 101-2.

However, the command to share the information of the incident card 111-1 with the second agency may be received in any suitable manner including, but not limited to, via the use of menus at the display screen 109-1, dedicated buttons, and the like, of the input devices 110, and the like.

In some examples, the actuatable option 117-1 may be provided at the incident card 111-1 when the incident card 111-1 is generated (e.g. and similarly, the actuatable option 117-2 may be provided at the incident card 111-2 when the incident card 111-2 is generated). However, in other examples, the actuatable option 117-1 may not be generated and displayed until incident cards 111 associated with a common incident is detected across different agencies. In some of these examples, the process 300 may further include the controller 220 and/or the computing device 201 and/or one or more of the computing devices 101 receiving, from an application (e.g. the application 223) implemented by one or more of the first computing device 101-1, the second computing device 101-2 and the third computing device 101-3 (e.g. the third computing device 101-3 in communication with the first computing device 101-1 and the second computing device 101-2 as described above), an indication that the given incident, associated with the incident card 111-1, is associated with a respective incident managed by the second agency.

Hence, for example, one or more of the computing devices 101 and/or the controller 220 may detect that each of the computing devices 101-1, 101-2 are managing a same incident and/or associated incidents, for example based on addresses of respective incidents being managed by the computing devices 101-1, 101-2 and/or incident types of respective incidents being managed by the computing devices 101-1, 101-2, among other possibilities. Hence, it is understood that one or more of the computing devices 101

(e.g. the third computing device 101-3) may have access to information being managed by the computing devices 101-1, 101-2.

While present examples are described with respect to the respective incidents being managed by the computing devices 101-1, 101-2 being a same incident (e.g. a "Robbery-In-Progress") the respective incidents being managed by the computing devices 101-1, 101-2 may be different, but associated, incidents; for example, a robbery and a shooting and/or a fire may be occurring at a same address. Hence, for example, a second incident (e.g. a shooting) may be associated with the given incident (e.g. the robbery) of the incident card 111-1.

The indication that the given incident is associated with a respective incident and/or a second incident may cause the first computing device 101-1 to provide, at the display screen 109-1, the actuatable option 117-1 associated with the incident card 111-1. Furthermore, in these examples, receiving the command to share the information of the incident card 111-1 with the second agency may comprise detecting activation of the actuatable option 117-1.

Furthermore, the indication that the given incident is associated with a respective incident managed by the second agency may comprise any suitable indicator that enables the first computing device 101-1 to identify the incident card 111-1 and/or control the display screen 109-1 to provide the actuatable option 117-1 at the incident card 111-1. In some examples, the indication that the given incident is associated with a respective incident managed by the second agency may include, but not limited to, an address and/or location of the respective incident managed by the second agency, an identifier of the incident card 111-1, and the like.

At a block 306, the controller 220 and/or the computing device 201 and/or one or more of the computing devices 101 transmits, via the first computing device 101-1, at least a subset of the information (e.g. associated with the first incident card 111-1) to the second computing device 101-2 associated with the second agency. In some examples, the at least the subset of the information may be transmitted with an explicit request (e.g. a sharing request) to share information, while in other examples, the transmission of the at least the subset of the information may act as an implicit and/or inherent sharing request to share information.

In some examples, the at least the subset of the information associated with the first incident card 111-1 transmitted to the second computing device 101-2 may include all of the information associated with the first incident card 111-1. However, in other examples, the at least the subset of the information associated with the first incident card 111-1 transmitted to the second computing device 101-2 may include less than all of the information associated with the first incident card 111-1.

The subset of the information may be selected via the input device 110-1 and/or the subset of the information may be predefined and/or preconfigured. For example, the subset of the information may be predetermined to include given fields, and the like, of the incident card 111-1 but exclude information from the chat window 113-1; and/or the subset of the information may be predetermined to include information from the chat window 113-1 and/or given information from the chat window 113-1 (e.g. messages from given participants of the chat, which may exclude certain participants of the chat). In a particular example, the subset of the information may exclude a current status and/or location of an agency officer and/or asset dispatched to the incident, but may include an identifier of an agency officer and/or asset associated with the incident (e.g. the subset of the information may include the identifier "A111456" but may exclude the status "En Route").

Regardless of how the subset of the information is determined, at the block 306, the subset of the information is transmitted to the second computing device 101-2 for example for one or more of storage, rendering at the display screen 109-2, and/or providing the subset of the information to the operator 108-2 in any suitable manner, such as via a shared incident card described in more detail below.

The controller 220 and/or the computing device 201 and/or one or more of the computing devices 101 may implement one or more of a block 308 and a block 310, as described hereafter. When the block 308 is implemented, the block 310 may also be implemented (e.g. as indicated by an arrow therebetween in FIG. 3), and/or the functionality represented by the block 308 and the block 310 may be combined. The block 308 and the block 310 are next described.

At a block 308, the controller 220 and/or the computing device 201 and/or one or more of the computing devices 101 controls, via the first computing device 101-1, at the display screen 109-1, a display attribute, associated with the incident card 111-1, to indicate that the information thereof is at least partially shared with the second agency. For example, the incident card 111-1 may be updated to include an alphanumeric and/or graphic indicator that information thereof is shared with the second agency; such an alphanumeric and/or graphic indicator may be similar to the graphical indication 115-1, for example provided in a border area and/or corner area of the incident card 111-1.

In some examples, subsequent information may be received and/or populated at the incident card 111-1 (e.g. after the command of the block 304 is received) for example by operator 108-1; the subsequent information may be automatically transmitted to the computing device 101-2. Such subsequent information may be received via the operator 108-1 interacting with the incident card 111-1 at communication device 107-1 via the input device 110-1, and the like. However, in other examples, subsequent information populated at the incident card 111-1 may not be automatically transmitted to the computing device 101-2.

In some examples, the process 300 may end after the block 308, for example at a block 311. However, yet further examples the block 308 may not be implemented, however the block 310 may be implemented, as described hereafter.

At a block 310, the controller 220 and/or the computing device 201 and/or one or more of the computing devices 101 generates, via the first computing device 101-1, at the display screen 109-1, a shared incident card in association with the incident card 111-1, the shared incident card visually distinguishable as including shared information relative to the incident card 111-1, and the shared incident card including at least the subset of the information.

The shared incident card at the display screen 109-1 is further visually distinguishable as including shared information relative to the incident card 111-1 (e.g. and similarly, a shared incident card at the display screen 109-2 is visually distinguishable as including shared information relative to the incident card 111-2). In some examples, the shared incident card may include an alphanumeric and/or graphic indicator that the shared incident card includes shared information. However, the shared incident card may be visually distinguishable from the incident card 111-1 in other ways. For example, the shared incident card may be one or more of:

Offset from the incident card 111-1 at the display screen 109-1. In these examples, the shared incident card may be rendered at a respective position at the display screen 109-1 which is offset from a position of the incident card 111-1. The offset respective position may allow the operator 108-1 to view both the incident card 111-1 and the shared incident card at the same time, and/or the incident card 111-1 and the shared incident card may obscure each other such that the operator 108-1 may switch between viewing the incident card 111-1 and the shared incident card at the display screen 109-1 by selecting one or the other of the incident card 111-1 and the shared incident card.

Stacked relative to the incident card 111-1 at the display screen 109-1. In these examples, the shared incident card may be rendered to appear stacked and/or over the incident card 111-1, or stacked under the incident card 111-1 (e.g. using suitable offsets), with, for example, a portion and/or an edge of each of the incident card 111-1 and the shared incident card at least partially visible regardless of which of the incident card 111-1 and the shared incident card is on top. In these examples, the operator 108-1 may switch between viewing the incident card 111-1 and the shared incident card at the display screen 109-1 by selecting a visible portion and/or edge of one or the other of the incident card 111-1 and the shared incident card.

Tabbed with the incident card 111-1 at the display screen 109-1. In these examples, the incident card 111-1 may be modified to include tabs (e.g. at a "top" of the incident card 111-1) for example a tab for the incident card 111-1 and a tab for the shared incident card. Hence, in these examples, the incident card 111-1 and the shared incident card may be stacked on each other such that only one of the incident card 111-1 and the shared incident card is visible at the display screen 109-1 at any given time, but with the respective tabs visible. These examples, the operator 108-1 may switch between viewing the incident card 111-1 and the shared incident card at the display screen 109-1 by selecting a respective tab of the incident card 111-1 and the shared incident card.

It is further understood that a same and/or similar respective shared incident card may be generated at the display screen 109-2 by the second computing device 101-2. For example, in response to receiving the at least the subset of the information (e.g. transmitted with an explicit request (e.g. a sharing request) to share information and/or the at least the subset of the information acting as an implicit and/or inherent sharing request to share information), the second computing device 101-2, and the like (e.g. any of the devices 101, 201) may responsively generate a respective shared incident card at the display screen 109-2. In some examples, the second computing device 101-2, and the like, may provide a prompt, and the like, at the displays screen 109-2 to accept or reject the sharing request, and the like, prior to generating the respective shared incident card at the display screen 109-2. When the sharing request is accepted (e.g. a positive response, and the like, to the prompt), the respective shared incident card is generated at the display screen 109-2. When the sharing request is not accepted (e.g. a negative response, and the like, to the prompt), the respective shared incident card is not generated at the display screen 109-2. In some examples, the second computing device 101-2 may transmit, to the first computing device 101-1, a response indicating whether sharing of information is accepted, or not, depending on whether a positive response or a negative response to the prompt is received. In some examples, when a negative response to the prompt is received, some or all of blocks 308 to 314 may not be implemented (e.g., the blocks 312-314 described below).

As depicted, the computing devices 101-1, 101-2 may continue to share information of the associated incidents via the shared incident card and/or respective shared incident cards at the display screens 109.

For example, as depicted, at a block 312, the controller 220 and/or the computing device 201 and/or one or more of the computing devices 101 receives, from the second computing device 101-2, respective information associated with one or more of the given incident and a second incident, associated with the given incident, the second incident managed by the second agency. For example the respective information received at the block 312 may be a subset of information of the incident card 111-2.

At a block 314, the controller 220 and/or the computing device 201 and/or one or more of the computing devices 101 adds, to the shared incident card, the respective information received at the block 314.

For example, when the command is received at the block 304, the block 306 may also be implemented at the second computing device 101-2, such that a subset of information associated with the incident card 111-2 is transmitted to the first computing device 101-1. Indeed, when it is determined that information of associated incidents is to be shared, the computing devices 101-1, 101-2 may each share associated information with the other of the computing devices 101-1, 101-2, for example as mediated and/or controlled by the third computing device 101-3.

Hence, for example, shared incident cards may be generated at each of the display screens 109 to show the information being shared between the computing devices 101-1, 101-2.

Hence, any subsequent information received at the shared incident card may be automatically transmitted to the second computing device 101-2, for example for rendering at a respective shared incident card rendered at the display screen 109-1. In other words, the process 300 may further comprise the controller 220 and/or the computing device 201 and/or one or more of the computing devices 101: receiving, via the first computing device 101-1, at the shared incident card, subsequent information associated with the given incident; and transmitting the subsequent information to the second computing device 101-2 (e.g. for rendering at a respective shared incident card).

In some of these examples, however, subsequent information received at the incident card 111-1 may not be transmitted to the second computing device 101-2. In this manner the operator 108-1 may restrict information which is shared by entering information into the incident card 111-1 but not the shared incident card. In other words, the process 300 may further comprise the controller 220 and/or the computing device 201 and/or one or more of the computing devices 101: receiving, via the first computing device 101-1, at the incident card 111-1, subsequent information associated with the given incident; and refraining from transmitting the subsequent information to the second computing device 101-2. In some of these examples, however, the operator 108-1 may enter subsequent information at the incident card 111-1 and provide an indication that such subsequent information is to be shared with the second computing device 101-2 (e.g. via an additional share command, and the like and/or by additional implementations of the block 304 and/or by actuation of the actuatable option 117-1); in these examples, such subsequent information may be used to continue to populate the shared information card and transmitted to the second computing device 101-2.

In some examples, at the block 310, the process 300 may further comprise the controller 220 and/or the computing device 201 and/or one or more of the computing devices 101: generating, via the first computing device 101-1, at the display screen 109-1, a read-only incident card in association with the incident card, the read-only incident card visually distinguishable as including shared read-only information relative to the incident card 111-1, and the read-only incident card including at least the respective information received from the second computing device 101-2. In particular, any further respective information received from the second computing device 101-2 is added to the shared incident card and the read-only incident card.

Hence, the shared incident card may show information shared between both of the computing devices 101-1, 101-2 and further be used to share such information; whereas the read-only incident card may include information received from the second computing device 101-2, but not information of the incident card 111-1.

The read-only incident card may be visually distinguishable as including shared read-only information relative to the incident card 111-1 by one or more of offsetting, stacking and/or tabbing the read-only incident card with the incident card 111-1 (e.g. and the shared incident card).

As described above, information may be shared with more than two agencies. Hence, the process 300 may further comprise the controller 220 and/or the computing device 201 and/or one or more of the computing devices 101: receiving (e.g. similar to the block 304), via the first computing device 101-1, one or more commands, including the command, to share the information of the incident card 111-1 with the second agency and one or more third agencies different from the first agency; transmitting (e.g. similar to the block 306), via the first computing device 101-1, at least the subset of the information to one or more third computing devices associated with the one or more third agencies; and one or more of: controlling (e.g. similar to the block 308) the display attribute, associated with the incident card 111-1, to indicate that the information thereof is at least partially shared with the second agency and the one or more third agencies; and including (e.g. similar to the block 310, the block 312 and the block 314), at the shared incident card, at least the subset of the information and respective information associated with one or more of the given incident and one or more furthers incidents, associated with the given incident, the one or more furthers incidents managed by one or more of the second agency and the one or more third agencies, the respective information received from one or more of the second agency and the one or more third agencies.

An example of the process 300 will next be described with respect to FIG. 4, FIG. 5 and FIG. 6 which are substantially similar to FIG. 1 with like components having like numbers.

Figure 4:
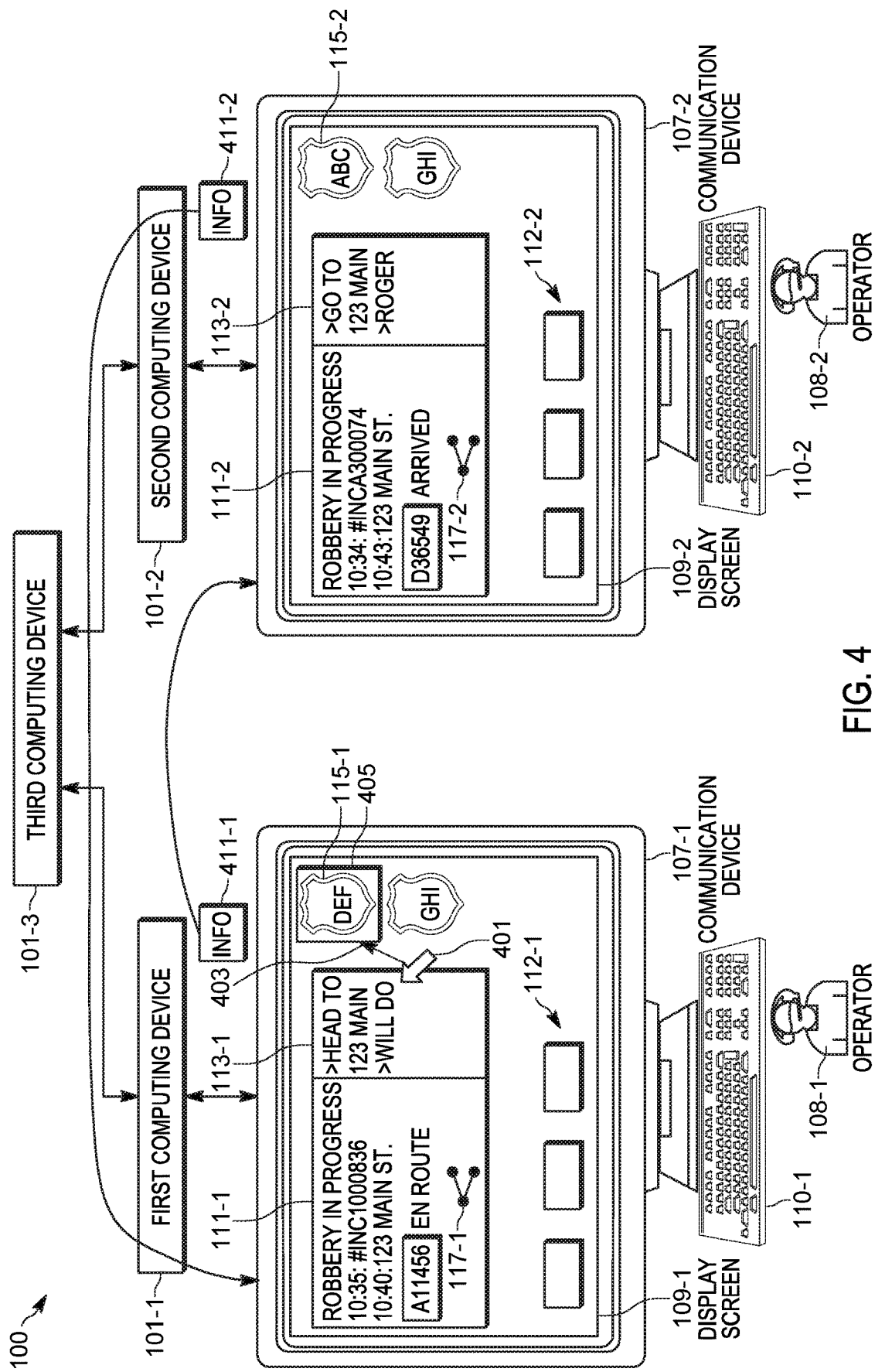
FIG. 4 depicts an example of the system of FIG. 1 implementing a process of sharing information in a public-safety answering point card-based environment, in accordance with some examples.

Attention is first directed to FIG. 4 which depicts the display screen 109-1 being controlled to provide (e.g. at the block 302 of the process 300) the incident card 111-1, as described above.

As further depicted in FIG. 4, a command is received (e.g. at the block 304 of the process 300) to share information of the incident card 111-1 with a second agency. In particular, a drag and drop occurs at the display screen 109-1. For example, the operator 108-1 may operate a pointing device of the input devices 110 to use a pointer 401 rendered at the display screen 109-1 to select the incident card 111-1, and drag and drop the incident card 111-1 on the graphical indication 115-1, as represented by an arrow 403. In some examples, as depicted, the graphical indication 115-1 may be at least temporarily highlighted to indicate selection thereof (e.g. as depicted the graphical indication 115-1 is highlighted via a box 405 thereof, though such highlighting may be indicated in any suitable manner and/or such highlighting may be optional).

As further depicted in FIG. 4, in response to the command represented by the drag and drop and/or the arrow 403, at least a subset of information 411-1 of the incident card 111-1 is transmitted (e.g. at the block 306 of the process 300) to the second computing device 101-2.

Similarly, in response to the command represented by the drag and drop, at least a subset of information 411-2 of the incident card 111-2 is transmitted from the second computing device 101-2 to the first computing device 101-1. In some examples, the second computing device 101-2 may provide a prompt at the display screen 109-2 that enables selection of the subset of the information 411-2 (e.g. and such a prompt may be distinct from a prompt to accept or reject a sharing request and/or such prompts may be combined); for example such a prompt may enable a selection of fields of the information 411-2 and/or groups of fields and/or a rejection of sharing of any fields (though the subset of the information 411-1 may still be shared at the display screen 109-2). The subset of information 411-2 of the incident card 111-2 may be transmitted from the second computing device 101-2 to the first computing device 101-1 in response to the second computing device 101-2 receiving the subset of the information 411-1, and/or by way of the third computing device 101-3 controlling the second computing device 101-2 to transmit the subset of the information 411-2. In some examples, the first computing device 101-1, in response to receiving the subset of information 411-2, may provide a prompt at the display screen 109-1 to confirm receipt of (or reject) the subset of information 411-2.

In the present example, it is understood that the subset of information 411-1 includes the information of the incident card 111-1 exclusive of the information of the chat window 113-1; similarly, in the present example, it is understood that the subset of information 411-2 includes the information of the incident card 111-2 exclusive of the information of the chat window 113-2. However, in other examples, the subset of information 411-1 and/or the subset of information 411-2 may include information of respective chat windows 113, among other possibilities.

As the respective subsets of information 411-1, 411-2 information are received at the devices 101-1, 101-2, one or more of the devices 101-1, 101-2, and the like, may provide a prompt (that may be combined with one or more of the prompts described above) at a respective display screen 109 for selection of how a respective shared incident card is to be provided, as described above; for example, such a prompt may enable a respective operator 108 to select whether a respective shared incident card is to be offset, stacked or tabbed, relative to a respective incident card 111 (and/or any other suitable format). While hereafter tabbed shared incident cards are described (e.g. a tabbed shared incident cards are selected) the shared incident cards may have any suitable format.

Figure 5:
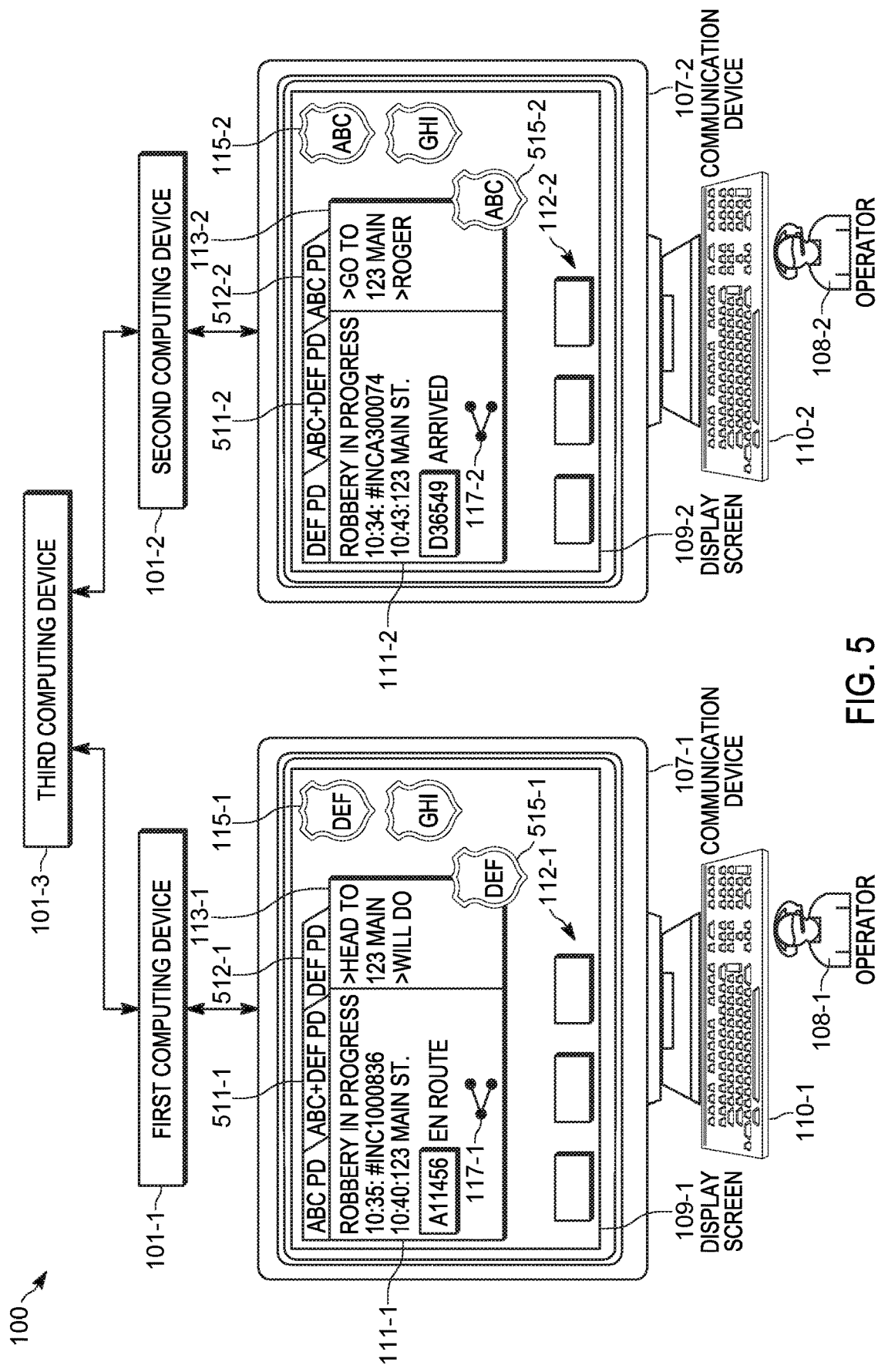
FIG. 5 depicts an example of the system of FIG. 1 continuing to implement a process of sharing information in a public-safety answering point card-based environment, in accordance with some examples.

Attention is next directed to FIG. 5 and FIG. 6, which depict the incident cards 111 tabbed with respective shared incident cards 511-1, 511-2, and read-only incident cards 512-1, 512-2. The shared incident cards 511-1, 511-2 are interchangeably referred to hereafter, collectively, as the shared incident cards 511 and, generically, as a shared incident card 511; similarly, the read-only incident cards 512-1, 512-2 are interchangeably referred to hereafter, collectively, as the read-only incident cards 512 and, generically, as a read-only incident card 512.

In FIG. 5, the shared incident cards 511 and the read-only incident card 512 are depicted as being stacked under respective incident cards 111, but accessible via respective tabs. In FIG. 6, for clarity, the incident cards 111, the shared incident cards 511 and the read-only incident card 512 are depicted as being separate from one other, and/or adjacent to one another, to show their respective information; however, it is understood in FIG. 6 that the incident cards 111, the shared incident cards 511 and the read-only incident cards 512 are accessible via their respective tabs, as in FIG. 5. Furthermore, while for clarity the other incident cards 112 are not depicted in FIG. 6, they are nonetheless understood to be present.

In particular, each tab identifies one or more respective agencies indicating a source of information of a respective card. For example, a tab for the incident card 111-1 comprises text "ABC PD" indicating that the incident card 111-1 comprises information associated with the "ABC" police department ("PD"); similarly, a tab for the shared incident card 511-1 comprises text "ABC+DEF PD" indicating that the shared incident card 511-1 comprises information associated with the "ABC" police department and the "DEF" police department; and similarly, a tab for the read-only incident card 512-1 comprises text "DEF PD" indicating that the read-only incident card 512-1 comprises information associated with the "DEF" police department.

With attention directed to FIG. 5, the incident cards 111 have been modified to include (e.g. at the block 308 of the process 300) respective indications 515-1, 515-2 of respective information being shared with another agency. For example, as depicted, each of the respective indications 515-1, 515-2 are respectively similar to the graphic indications 115-1, 115-2. Hence, each of the respective indications 515-1, 515-2 provide an indication of a respective agency with which information is being shared.

Attention is next directed to FIG. 6 which depicts the shared incident cards 511 (e.g. as generated at the block 310 of the process 300) as well as the read-only incident cards 512. In particular, the shared incident cards 511 includes the subsets of the information 411-1, 411-2; for example, the shared incident cards 511 includes the subset of the information 411-1 transmitted to the second computing device 101-2, and the subset of the information 411-2 transmitted to the first computing device 101-1 (e.g. received at the first computing device 101-1 at the block 312 of the process 300, and added to the shared incident card 511-1 at the block 314 of the process 300).

In contrast, the read-only incident card 512-1 at the display screen 109-1 includes the subset of the information 411-2 received at the first computing device 101-1, but excludes the subset of the information 411-1 transmitted to the first computing device 101-1. Similarly, the read-only incident card 512-2 at the display screen 109-2 includes the subset of the information 411-1 received at the second computing device 101-2, but excludes the subset of the information 411-2 transmitted to the first computing device 101-1. Hence, the read-only incident card 512-1 is similar to the incident card 111-2, but excludes the information of the chat window 113-2; similarly, the read-only incident card 512-2 is similar to the incident card 111-1, but excludes the information of the chat window 113-1.

As subsequent information is received at the incident card 111-1 and/or the shared incident card 511-1, the subsequent information is transmitted to the second computing device 101-2 to update the shared incident card 511-2 and the read-only incident card 512-2. Similarly, as respective subsequent information is received at the incident card 111-2 and/or the shared incident card 511-2, the respective subsequent information is transmitted to the first computing device 101-1 to update the shared incident card 511-1 and the read-only incident card 512-1.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method comprising:
   controlling, via a first computing device associated with a first agency, a display screen to provide an incident card associated with a given incident managed by the first agency, the incident card comprising information associated with the given incident, the incident card being provided in a card-based environment at the display screen;
   receiving, via the first computing device, a command to share the information of the incident card with a second agency different from the first agency by one or more of detecting activation of an actuatable option associated with the incident card and receiving input identifying the second agency;
   transmitting, via the first computing device, at least a subset of the information to a second computing device associated with the second agency; and,
   one or more of:
      controlling, via the first computing device, at the display screen, a display attribute, associated with the incident card, to indicate that the information thereof is at least partially shared with the second agency, the display attribute comprising one or more of an alphanumeric and graphic indicator that the information is shared with the second agency; and
      generating, via the first computing device, at the display screen, a shared incident card in association with the incident card, the shared incident card visually distinguishable as including shared information relative to the incident card, and the shared incident card including at least the subset of the information.

2. The method of claim 1, wherein the shared incident card is one or more of:
   offset from the incident card at the display screen;
   stacked relative to the incident card at the display screen; and
   tabbed with the incident card at the display screen.

3. The method of claim 1, further comprising:
   receiving, from the second computing device, respective information associated with one or more of the given incident and a second incident, associated with the given incident, the second incident managed by the second agency; and
   adding, to the shared incident card, the respective information.

4. The method of claim 3, further comprising:
   generating, via the first computing device, at the display screen, a read-only incident card in association with the incident card, the read-only incident card visually distinguishable as including shared read-only information relative to the incident card, and the read-only incident card including at least the respective information received from the second computing device,
   wherein any further respective information received from the second computing device is added to the shared incident card and the read-only incident card.

5. The method of claim 1, wherein receiving the command to share the information of the incident card with the second agency comprises: detecting a drag and drop, at the display screen, of the incident card to a graphic indication the second agency.

6. The method of claim 1, further comprising:
   receiving, from an application implemented by one or more of the first computing device, the second computing device and a third computing device in communication with the first computing device and the second computing device, an indication that the given incident, associated with the incident card, is associated with a respective incident managed by the second agency; and
   providing, at the display screen, the actuatable option associated with the incident card,
   wherein receiving the command to share the information of the incident card with the second agency comprises detecting activation of the actuatable option.

7. The method of claim 1, further comprising:
   receiving, via the first computing device, at the incident card, subsequent information associated with the given incident; and
   refraining from transmitting the subsequent information to the second computing device.

8. The method of claim 1, further comprising:
   receiving, via the first computing device, at the shared incident card, subsequent information associated with the given incident; and
   transmitting the subsequent information to the second computing device.

9. The method of claim 1, further comprising:
   receiving, via the first computing device, one or more commands, including the command, to share the information of the incident card with the second agency and one or more third agencies different from the first agency;

transmitting, via the first computing device, at least the subset of the information to one or more third computing devices associated with the one or more third agencies; and one or more of:
controlling the display attribute, associated with the incident card, to indicate that the information thereof is at least partially shared with the second agency and the one or more third agencies; and including, at the shared incident card, at least the subset of the information and respective information associated with one or more of the given incident and one or more furthers incidents, associated with the given incident, the one or more furthers incidents managed by one or more of the second agency and the one or more third agencies, the respective information received from one or more of the second agency and the one or more third agencies.

10. The method of claim 1, wherein the method includes the controlling, via the first computing device, at the display screen, the display attribute, associated with the incident card, to indicate that the information thereof is at least partially shared with the second agency.

11. The method of claim 1, wherein the method includes the generating, via the first computing device, at the display screen, the shared incident card in association with the incident card, the shared incident card visually distinguishable as including shared information relative to the incident card, and the shared incident card including at least the subset of the information, occurs.

12. A device comprising:
a communication unit; and
a controller configured to:
control, via the communication unit, a display screen, of a first computing device associated with a first agency, to provide an incident card associated with a given incident managed by the first agency, the incident card comprising information associated with the given incident, the incident card being provided in a card-based environment at the display screen;
receive, via the communication unit, a command to share the information of the incident card with a second agency different from the first agency by one or more of: detecting activation of an actuatable option associated with incident card and receiving input identifying the second agency;
transmit, via the communication unit, at least a subset of the information to a second computing device associated with the second agency; and,
one or more of:
control, via the communication unit, at the display screen, a display attribute, associated with the incident card, to indicate that the information thereof is at least partially shared with the second agency, the display attribute comprising one or more of an alphanumeric and graphic indicator that the information is shared with the second agency; and
generate, at the display screen, a shared incident card in association with the incident card, the shared incident card visually distinguishable as including shared information relative to the incident card, and the shared incident card including at least the subset of the information.

13. The device of claim 12, wherein the shared incident card is one or more of offset from the incident card at the display screen;
stacked relative to the incident card at the display screen; and
tabbed with the incident card at the display screen.

14. The device of claim 12, wherein the controller is further configured to:
receive, from the second computing device, respective information associated with one or more of the given incident and a second incident, associated with the given incident, the second incident managed by the second agency; and
add, to the shared incident card, the respective information.

15. The device of claim 14, wherein the controller is further configured to:
generate, at the display screen, a read-only incident card in association with the incident card, the read-only incident card visually distinguishable as including shared read-only information relative to the incident card, and the read-only incident card including at least the respective information received from the second computing device,
wherein any further respective information received from the second computing device is added to the shared incident card and the read-only incident card.

16. The device of claim 12, wherein the controller is further configured to receive the command to share the information of the incident card with the second agency by:
detecting a drag and drop, at the display screen, of the incident card to a graphic indication the second agency.

17. The device of claim 12, wherein the controller is further configured to:
receive an indication that the given incident, associated with the incident card, is associated with a respective incident managed by the second agency; and
provide, at the display screen, the actuatable option associated with the incident card,
wherein receiving the command to share the information of the incident card with the second agency comprises detecting activation of the actuatable option.

18. The device of claim 12, wherein the controller is further configured to:
receive, at the incident card, subsequent information associated with the given incident; and
refrain from transmitting the subsequent information to the second computing device.

19. A method comprising:
controlling, via a first computing device associated with a first agency, a display screen to provide an incident card associated with a given incident managed by the first agency, the incident card comprising information associated with the given incident, the incident card being provided in a card-based environment at the display screen;
receiving, from an application implemented by one or more of the first computing device, a second computing device associated with a second agency different from the first agency, and a third computing device in communication with the first computing device and the second computing device, an indication that the given incident, associated with the incident card, is associated with a respective incident managed by the second agency;
providing, at the display screen, an actuatable option associated with the incident card;

receiving, via the first computing device, a command to share the information of the incident card with the second agency by detecting activation of the actuatable option;

transmitting, via the first computing device, at least a subset of the information to the second computing device associated with the second agency; and one or more of: controlling, via the first computing device, at the display screen, a display attribute, associated with the incident card, to indicate that the information thereof is at least partially shared with the second agency, the display attribute comprising one or more of an alphanumeric and graphic indicator that the information is shared with the second agency; and generating, via the first computing device, at the display screen, a shared incident card in association with the incident card, the shared incident card visually distinguishable as including shared information relative to the incident card, and the shared incident card including at least the subset of the information.

* * * * *